E. MOWRY.
HITCH FOR TRAILING VEHICLES.
APPLICATION FILED SEPT. 20, 1913.
1,226,687.
Patented May 22, 1917.
2 SHEETS—SHEET 1.
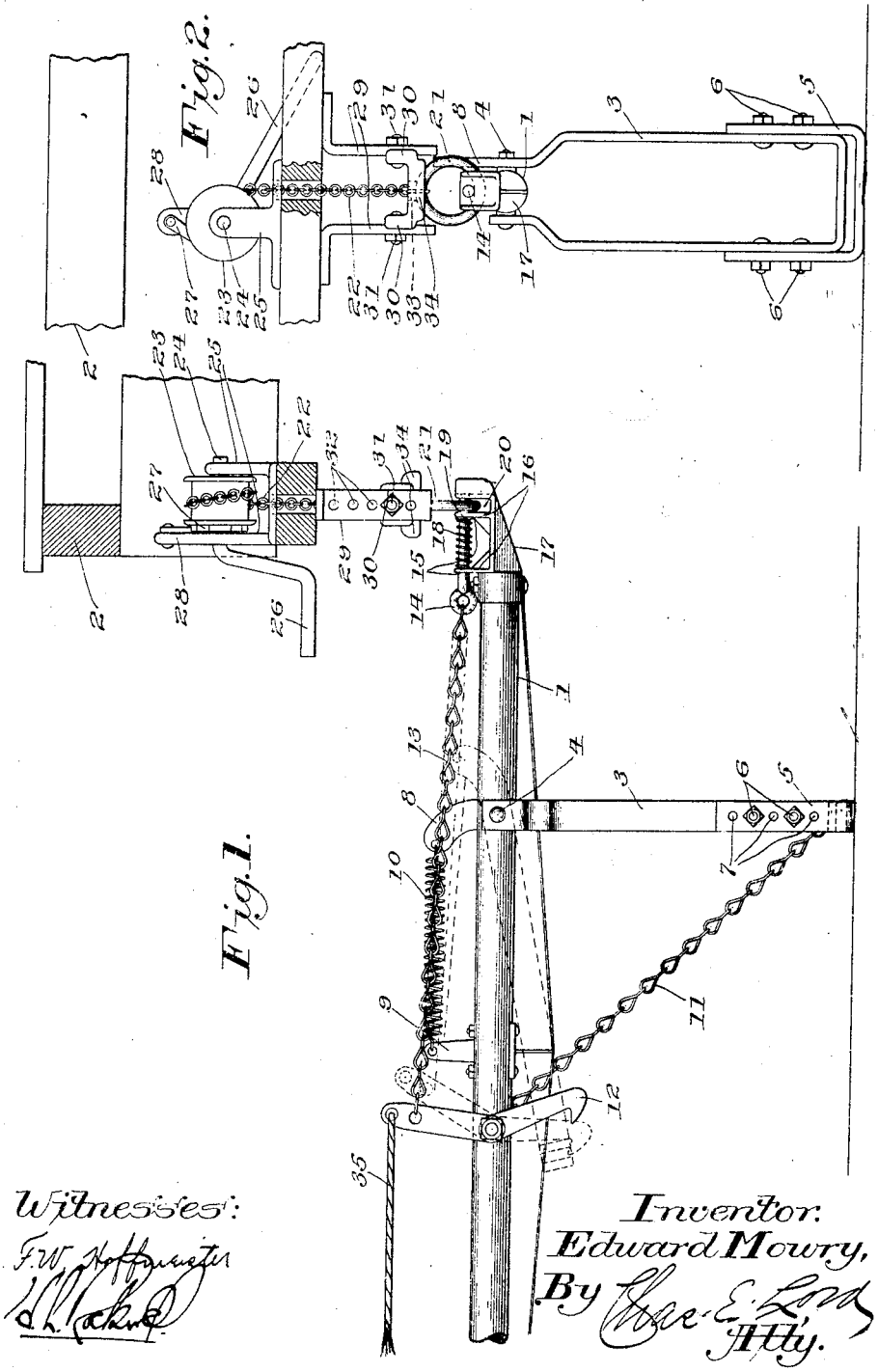
Witnesses:
F. W. Hoffmeister
Inventor:
Edward Mowry,
By Chas. E. Lord
Atty.

E. MOWRY.
HITCH FOR TRAILING VEHICLES.
APPLICATION FILED SEPT. 20, 1913.
1,226,687.
Patented May 22, 1917
2 SHEETS—SHEET 2.
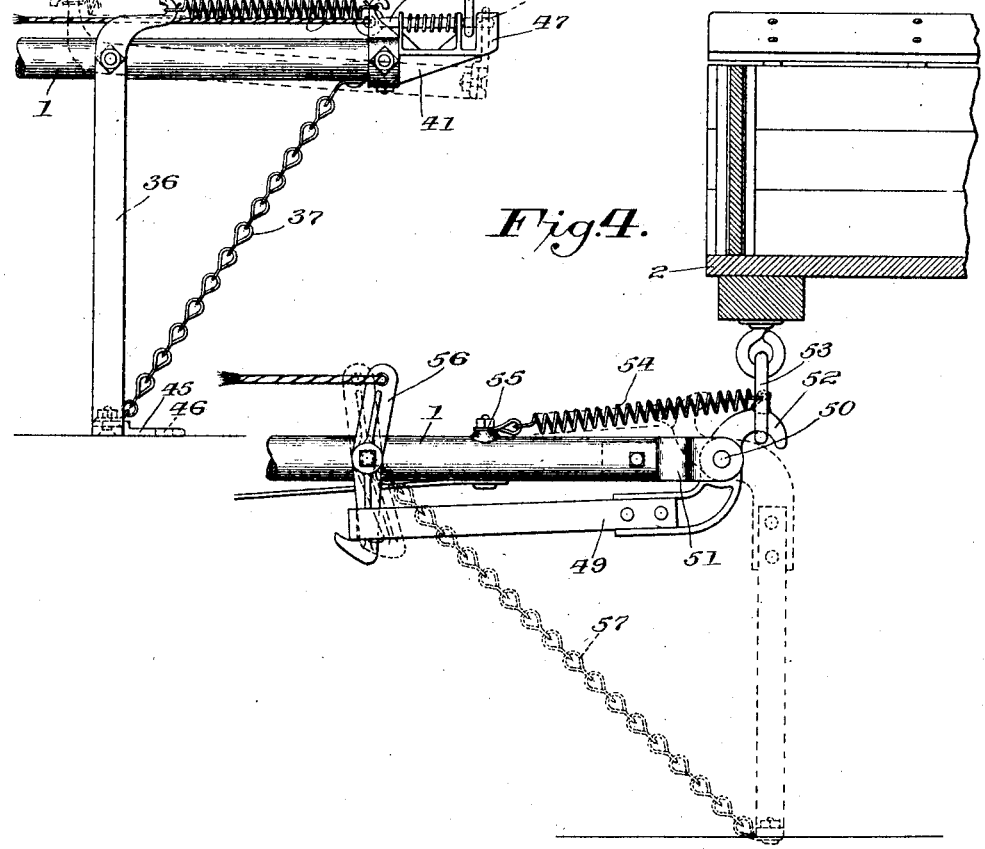
Witnesses:
Inventor.
Edward Mowry,
By Chas. E. Lord
Atty.

UNITED STATES PATENT OFFICE.

EDWARD MOWRY, OF STERLING, ILLINOIS, ASSIGNOR TO INTERNATIONAL HARVESTER COMPANY OF NEW JERSEY, A CORPORATION OF NEW JERSEY.

HITCH FOR TRAILING VEHICLES.

1,226,687.     Specification of Letters Patent.     Patented May 22, 1917.

Application filed September 20, 1913. Serial No. 790,942.

*To all whom it may concern:*

Be it known that I, EDWARD MOWRY, a citizen of the United States, residing at Sterling, in the county of Whiteside and State of Illinois, have invented certain new and useful Improvements in Hitches for Trailing Vehicles, of which the following is a full, clear, and exact specification.

My invention relates to hitches for trailing vehicles.

It has among its objects to attach and detach a trailing vehicle in an improved manner. A more specific object of my invention is to provide improved mechanism especially adapted to use in connection with hay loaders, which is operable from the wagon to detach the loader from the same and support the loader tongue in elevated position ready to be again attached to the wagon after the latter is unloaded, the operator not being required to climb down from the load to release the same. I attain these objects by the provision of improved draft connections comprising improved latching mechanism operable by the operator on the wagon to release the loader when desired, and improved automatic means coöperating therewith swinging in under the tongue of the loader when the latter is released and maintaining the same in elevated position.

In the accompanying drawings I have shown three embodiments which my invention may assume in practice, illustrating the same in connection with a hay loader. It is to be understood, however, that these forms are shown herein for the purposes of illustration and that my invention may assume other forms.

Figure 1 is a side elevation of one of the draft connections;

Fig. 2 is an end elevation of the same;

Fig. 3 is a side elevation of a modified form of construction; and

Fig. 4 is a side elevation of a further modified form of construction.

In these drawings I have illustrated a hay loader tongue or draft member 1 trailing in the rear of a wagon box 2, the draft tongue 1 being attached to the box 2 in an improved manner hereinafter described, and supported, when detached from that machine, by means of a pivoted leg 3.

Referring first to the construction shown in Figs. 1 and 2, it is to be noted that the draft member, or tongue 1, is provided with a leg 3 pivoted thereto at a point adjacent its front end. This leg is of substantially U-shape construction, the two arms thereof being pivoted to the tongue at 4 at their upper end and provided at their lower end with an adjustable foot 5 which may be adjusted vertically with respect to the leg by means of suitable bolts 6, the foot being likewise of substantially U-shape and fitting over the lower end of the leg, while the bolts 6 are adjustable in a plurality of holes or openings 7 formed in the bottom of said leg. The upper end of this leg is provided with an extension 8 projecting above the tongue 1 and protruding slightly rearwardly, which is connected to a fixed stop 9 carried on the top of the tongue 1 through a coiled longitudinally expanding spring 10 which normally acts to swing the same into the down position shown in Fig. 1.

The downward movement of the lower end of this leg 3 is limited by any suitable limiting means, such, for example, as a flexible connection or chain 11 attached at one end to the lower end of the leg and at the other to the pole 1. To retain the leg 3 in its elevated position, shown in dotted lines in Fig. 1, I have provided a pivoted latch 12 having a hooked lower end adapted to engage the lower U-shaped portion or foot on the leg 3 when the latter is in its dotted line position. This latch 12 is provided with a vertically projecting arm extending above the tongue 1, operatively connected through a chain or other suitable connecting means 13 with a latch bolt 14 longitudinally movable in a plane parallel to the tongue in bearings 15 formed in spaced upstanding arms 16 on a bracket 17 carried on the extreme front end of the tongue and normally held in the position shown in Fig. 1 by means of a coiled spring 18, which encircles the bolt or pin 14 in the operation thereof between the arms 16 and is attached to the bolt at 19.

Coöperating with the bolt 14, and receivable in a slot 20 formed in the bracket 17, is a draft ring or other connecting member 21 attached to the leading machine 2. As shown, this draft ring 21 is carried on the lower end of a chain 22, which is, in turn, carried on a windlass or sheave 23 rotatably mounted on a shaft 24 in brackets 25 carried on the frame 2, and operable by a handle 26, a pawl and ratchet mechanism 27 being interposed between the sheave 23 and an extension 28 on one of the arms 25 to position the ring in any desired vertical position. Further, as shown, the chain 22, to which this ring is attached, extends down through a depending bracket 29 fixed to the under side of the frame. This bracket is shown to comprise a plurality of substantially L-shaped frame members rigidly connected to an adjustable bracket member 30 by means of bolts 31, these bolts being adjustable in any one of a plurality of holes 32 formed in the vertical portions of the members 29. As shown in Figs. 1 and 2, the bracket 30 is provided with a central bore 33 therein, through which the chain passes, and is provided with a slotted or cut away surface adjacent this bore to receive the ring and with lateral extensions 34 which protrude beyond the sides of the members 29. Obviously, however, the attaching mechanism carried on the loader tongue may coöperate with any suitable draft rig on the wagon and is not necessarily limited to use in connection with that just described.

In the operation of the construction shown, a rope or other operating means 35 is attached to the upstanding arm on the latch 12 at a point above the connection of the chain 13 thereto, and the free end of this rope is carried to any convenient position on the hay loader frame so that the operator may reach the same from the wagon when desired. Assuming that the parts are in the dotted line position shown in Fig. 1, a pull upon this rope would obviously turn the latch 12 about its pivot, releasing the leg 3 so that the spring 10, attached to the upper end thereof, will coöperate with the pull of gravity in throwing the leg to its down or full line position. At the same time the angular movement of the arm 12 about its pivot automatically acts through the chain 13 to pull out the pin 14 from its connection with the ring 21 in such a manner that the tongue 1 is freed from the frame 2, the ring 21 being pulled out of the slot 20 upon a forward movement of the frame 2. It is to be noted in this connection that upon a release of the latch mechanism the leg 3 is positioned under the tongue 1 in such a manner as to support the same in elevated position at the time that the latch is released. Obviously, should the operator desire to again connect the tongue to the frame 2, as, for instance, after the first load has been taken off the wagon, this may be readily accomplished by pulling out the pin 14 and again releasing the same after the ring 21 has been positioned in the slot 20. Further, it is to be noted that the latch 12 acts automatically to catch the leg 3 in its elevated position when the latter is raised manually after the attachment of the loader to the wagon. Obviously, if desired, the operator may adjust the height at which the tongue 1 is supported with respect to the frame 2 by an adjustment of the bolts 31 in the openings 32 on the supporting bracket carried by the frame 2, and he may also adjust the height at which the tongue 1 is supported with respect to the ground by means of adjusting the bolts 6 in the openings 7 in the foot. Attention is further directed to the fact that by the provision of the windlass greater facility in attaching the loader to the wagon is provided, it being unnecessary to back the team repeatedly to bring the wagon into an exact relation to the loader, as the chain, when removed from the windlass, can be attached to the tongue, and the tongue can then be drawn into position by the windlass within any desired radius.

In Fig. 3 I have shown a modified form of the construction shown in Fig. 1, wherein a leg 36 is pivoted similarly to the leg 3 heretofore described, but adapted, when released to swing toward the rear end of the tongue rather than toward the front end of the same, a more compact construction being provided, which is located nearer the end of the loader pole. It is to be noted that in this construction the tongue is equipped with a chain 37 similar to that heretofore described, preventing the latter from swinging too far backward, and is provided with a hookshaped upper end 38 which is connected to a longitudinally extending coiled spring 39, the front end of which is in turn connected to an upstanding latch hook 40 carried on a casting 41 corresponding to the casting 17. As in the construction heretofore described, a latch pin 42 is also employed, which is slidable in this casting in substantially the same manner. This pin 42 is in this construction, however, directly connected to the rope 43, and in addition to coöperating with a draft ring 44 carried on the front frame 2, acts to hold the leg 36 in its elevated position, a laterally extending foot 45 being provided on the leg 36, having a slotted portion 46 which is received between lugs or shoulders 47 on the end of the bracket 41, and positioned opposite the pin 42, a suitable opening 48 being provided in the bracket 41 between the lugs 47, so that the pin is free to move not only through the ring 44 but through the opening 46 in the foot 45 and hold the same in the dotted line position shown. The operation of this construction will obviously be substantially the same as that described in connection with Figs. 1 and 2, a pull upon the rope 43 withdrawing the pin and releasing the tongue from the draft ring 44, at the same time releasing the leg 36, which is then moved to the full line position by the combined efforts of the spring 39 and the pull of gravity. It is to be noted that in this construction I have not illustrated any adjusting means for the ring. Obviously, such means may be used if desired.

In Fig. 4 I have shown a further modified form of construction which closely resembles the construction shown in Figs. 1 and 3. In this construction a leg 49 is journaled at 50 in a casting 51 carried on the extreme front end of the pole 1, and is provided with a hook 52 on its upper end which is adapted to move through a draft ring 53 carried on the frame 2, a coiled spring 54 being attached to a suitable projection on this end 52 and having its opposite end attached at 55 to the tongue. As in the construction heretofore described in connection with Figs. 1 and 2, a latch member 56 is employed to support the end of the leg 49 in its up or elevated position, and a chain 57 is used to limit the forward movement of the leg when moving toward its down position. Obviously, the operation of this construction is similar to the operation of the constructions heretofore described, the movement of the latch 56, when the rope is pulled, releasing the leg 49 which, as it moves downward, automatically releases its hooked end from the draft ring 52.

While I have in this application described several forms which my invention may assume, it is, of course, to be understood that the forms shown for the purposes of illustration are susceptible of modification without departing from the spirit of the invention.

What I claim as my invention, and desire to secure by Letters Patent, is:

1. In combination, a plurality of trailing units, and a draft tongue carried on said trailing unit attached to the leading unit, a normally operative support pivoted on said tongue and normally disposed in substantially parallel relation therewith during transport, and means for releasing said tongue from said leading unit and said support from its elevated position in one operation.

2. In a draft connection, in combination, a plurality of movable units, a draft tongue on one of the same, a draft connection on the other thereof operatively connected thereto, a support pivoted on said tongue, and means normally attaching said tongue to said draft connection and supporting said support in a plane substantially parallel to said tongue operable from a remote point to release said tongue and support.

3. In a draft attachment, a draft tongue, a support for said tongue, a bracket carried on said tongue, a plunger reciprocably mounted in said bracket, a latch holding said support in elevated position, and operative connections between said plunger and latch actuating one of the same upon actuation of the other.

4. In a draft attachment, a draft tongue, a support pivoted thereon, resilient means normally tending to throw said support to operative position, a bracket carried on said tongue, a plunger reciprocably mounted in said bracket, releasable means for holding said support in elevated position, and operative connections between said plunger and means actuating one of the same upon actuation of the other.

5. In a draft attachment, a draft tongue, a support pivoted thereon adjacent the end of the same, resilient means connecting the pivoted end of said support and said tongue, a bracket carried on the end of said tongue, a plunger reciprocably mounted in said bracket, a latch holding said support in elevated position, and operative connections between said plunger and latch actuating one of the same upon actuation of the other.

6. In a draft connection, in combination with a trailing unit, a draft tongue thereon, a spring pressed supporting leg for said tongue pivoted thereto, a latch member pivoted to said tongue at a point intermediate its ends having one end thereof engageable with said leg and normally holding the same in inoperative position, a leading unit, and releasable means for connecting the same to said tongue.

7. In a draft connection, a tongue, a support pivoted thereon, resilient connections between said support and said tongue normally tending to maintain the former in operative position, a bracket carried on the end of said tongue, a plunger slidable therein, a latch retaining said support in elevated position and said resilient connections under tension, and means operatively connected to said latch and plunger releasing said support and plunger substantially simultaneously.

8. In a draft connection, a tongue, a support pivoted thereon, resilient connections between said support and said tongue normally maintaining the former in operative position, a latch carried on said tongue engaging said support when in its inoperative position, said latch having an arm extending above said tongue, a bracket carried on the end of said tongue, a spring-pressed plunger reciprocable therein, operative connections between said plunger and the upstanding arm on said latch, and means for oscillating said arm to actuate said plunger and latch.

9. In a draft connection, in combination with a movable unit, a windlass thereon, a flexible draft member wound on said windlass, a second movable unit, a draft connection thereon to which said flexible member is operatively connected, and means operable from a remote point for releasing said draft connection.

10. In a draft connection, in combination with a movable unit, a draft member thereon, means for varying the operative height of the same, a trailing unit, a draft member thereon operatively connected to said first mentioned draft member, a support for said draft member, means for holding said support in inoperative position, and means operable from a remote point for releasing said draft members and said support.

11. In a draft connection, in combination with a movable unit, a depending draft member thereon, means for varying the effective length thereof, a trailing unit, a draft tongue thereon, releasable means for operatively connecting said draft tongue to said depending draft member, a tongue support pivoted thereto, means for holding the same in inoperative position, and means for releasing said releasable means and said holding means in a single operation.

12. In a draft connection, in combination with a movable unit, a windlass thereon, a flexible draft member wound on said windlass, a second movable unit, a draft connection thereon to which said flexible draft member is operatively connected, a normally operative supporting member for said draft connection carried thereon, means for holding the same in operative position, and means operable from a remote point for releasing said draft connection and supporting member.

13. In a draft attachment, a frame, a bracket carried beneath the same, a windlass journaled on the top of said frame, pawl and ratchet mechanism controlling the operation of said windlass, a chain carried on said windlass extending down through said bracket and guided thereby, and a draft ring carried on the lower end of said chain limited in its upward movement by engagement with said bracket.

14. In a draft connection, a frame, a windlass mounted thereon a plurality of spaced depending bracket members carried in the under surface thereof, a connecting bracket member having a bore therein, means for adjustably attaching said bracket members vertically adjustable with respect to said first mentioned bracket members, a chain carried on said windlass extending down through the bore in said bracket member, and a draft ring carried on the lower end of said chain.

15. In a draft connection, a vehicle frame, a plurality of spaced bracket members attached to the under side thereof protruding downwardly substantially parallel to each other, a transversely disposed bracket member vertically adjustable with respect thereto bridging the space between the same and rigidly attached thereto, said transverse bracket member having a vertically extending bore therein, a chain protruding from said bore, a draft ring carried on the lower end of said chain, and means for varying the vertical position of said draft ring.

In testimony whereof I affix my signature, in the presence of two witnesses.

EDWARD MOWRY.

Witnesses:
C. A. BURGESS,
A. G. HUBBARD.